Figure 1:
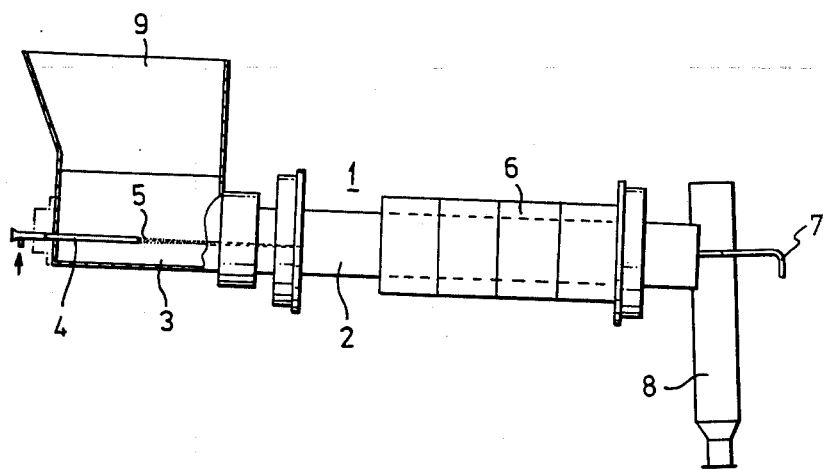

United States Patent [19]

Butler et al.

[11] 4,397,824
[45] Aug. 9, 1983

[54] CONVERSION OF URANIUM HEXAFLUORIDE TO OXIDES OF URANIUM

[75] Inventors: Gregg G. Butler, Kirkham; George M. Gillies, St. Annes; Thomas J. Heal, St. Annes; James E. Littlechild, St. Annes, all of England

[73] Assignee: British Nuclear Fuels Ltd., Cheshire, England

[21] Appl. No.: 212,640

[22] Filed: Dec. 3, 1980

[30] Foreign Application Priority Data

Dec. 10, 1979 [GB] United Kingdom ................ 7942507

[51] Int. Cl.³ ............................................. C01G 56/00
[52] U.S. Cl. .................................... 423/260; 423/253; 423/261
[58] Field of Search ......................... 423/253, 260, 261

[56] References Cited

U.S. PATENT DOCUMENTS 3,698,697 10/1972 Gillies et al. .......................... 432/117
3,845,193 10/1974 Littlechild et al. ................. 423/261
3,978,194 8/1976 Knudsen et al. .................... 423/261

Primary Examiner—Herbert T. Carter
Attorney, Agent, or Firm—Larson and Taylor

[57] ABSTRACT

In a process for the conversion of uranium hexafluoride to an uranium oxide by injecting uranium hexafluoride and dry steam into a first region of a vessel so as to form a plume of particles of uranyl fluoride and reacting the uranyl fluoride in a second region of the vessel with a countercurrent flow of steam and/or hydrogen the operation of the process is such that a major proportion of the uranyl fluoride is caused to circulate within the first region so that the original uranyl fluoride particles are able to grow and agglomerate in a dendritic manner.

2 Claims, 2 Drawing Figures

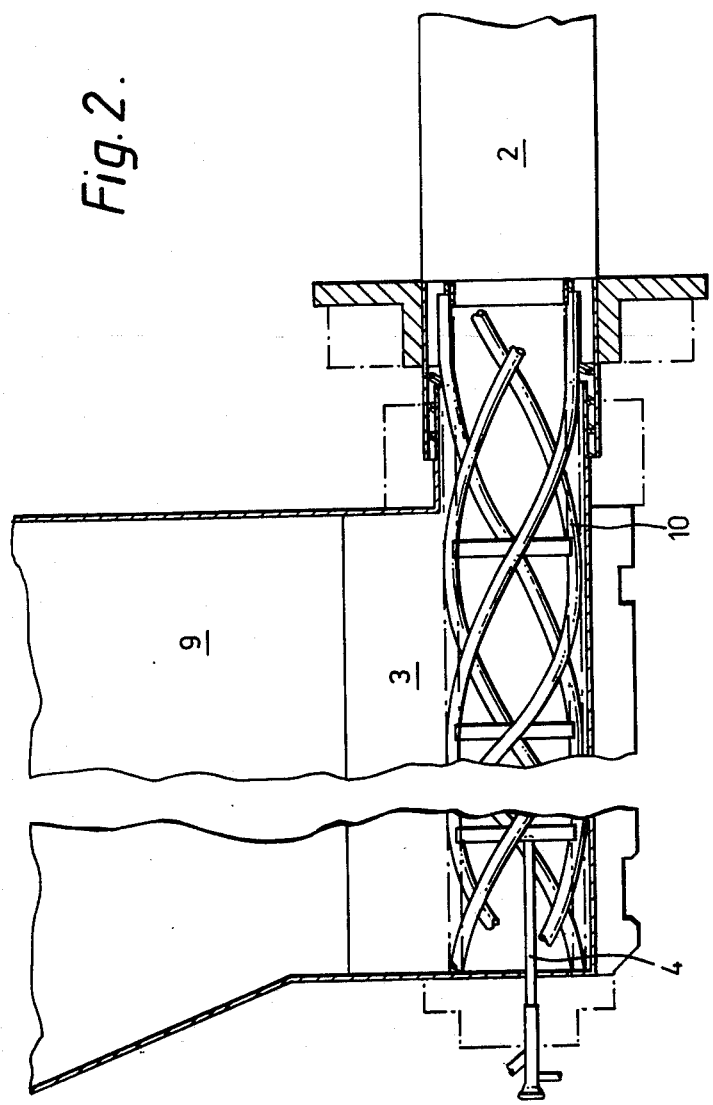

CONVERSION OF URANIUM HEXAFLUORIDE TO OXIDES OF URANIUM

This invention relates to the conversion of uranium hexafluoride to oxides of uranium.

BACKGROUND OF THE INVENTION

The reaction of uranium hexafluoride with dry steam to produce uranyl fluoride ($UO_2F_2$) is well known and so is the reaction of the uranyl fluoride at a higher temperature with steam or hydrogen or a steam/hydrogen mixture to produce uranium oxides. It is also well known from, for example U.K. Patent Specification No. 1,320,137 and corresponding U.S. Pat. No. 3,845,193 that the two reactions may be performed sequentially in the same vessel, uranium hexafluoride and dry steam being injected together into the first region of a vessel so as to form a plume of uranyl fluoride from which uranyl fluoride is passed to the second region of the same vessel, and the uranyl fluoride reacting in the second region with a countercurrent flow of steam and/or hydrogen.

SUMMARY OF THE INVENTION

According to the invention in a process for the conversion of uranium hexafluoride to a uranium oxide by injecting uranium hexafluoride and dry steam into a first region of a vessel so as to form a plume of particles of uranyl fluoride and reacting the uranyl fluoride in a second region of the vessel with a countercurrent flow of steam and/or hydrogen the operation of the process is such that a major proportion of the uranyl fluoride is caused to circulate within the first region so that the original uranyl fluoride particles are able to grow and agglomerate in a dendritic manner.

A dendritic agglomerate of high porosity is considered desirable for the uranyl fluoride since it is retained in the finished product (eg uranium dioxide) and can result in uranium dioxide compacts of high strength which, on sintering, yield nuclear fuel pellets of satisfactory quality. For the growth and agglomeration in a dendritic manner to occur, as required by the invention, it is not considered sufficient merely to prolong the stay of the uranyl fluoride in the first region of the vessel. It is necessary for the uranyl fluoride particles to circulate within the first region so that the reaction between the uranium hexafluoride and steam continues in the presence of the particles which thus provide nuclei which can grow with the production of further uranyl fluoride.

DESCRIPTION OF THE DRAWINGS AND PREFERRED EMBODIMENT

A suitable vessel for carrying out the process of the invention is described in U.S. Pat. No. 3,698,697 and is also shown in the accompanying drawings in which FIG. 1 is a diagrammatic side view of the vessel and FIG. 2 is a partly sectioned view on a larger scale of the inlet chamber of the vessel.

As shown in the drawings the vessel 1 comprises an inclined rotating barrel type kiln 2 having an inlet chamber 3 forming a first region of the vessel into which the uranium hexafluoride and dry steam are injected horizontally through coaxial inner and outer tubes of a jet 4 to produce a plume 5 of particles of uranyl fluoride. The kiln 2 forms a second region of the vessel provided with heating elements 6, in which the uranyl fluoride produced in the inlet chamber 3 is converted to uranium oxide by a countercurrent flow of steam and/or hydrogen, entering the kiln 2 through an inlet 7. The uranium oxide is discharged through an outlet chamber 8. Filters (not shown) in a housing 9 above the inlet chamber 3 are provided to collect uranyl fluoride carried back into the chamber 3 by waste gases emerging from the upper end of the kiln barrel 2 and the collected uranyl fluoride is dislodged by blow back facilities, falling through the plume 5 of particles of uranyl fluoride to the bottom of the inlet chamber 3. There it is picked up by means provided for moving any uranyl fluoride deposited in the inlet chamber into the upper end of the kiln barrel. These means have been omitted from FIG. 1 but are shown in FIG. 2 and comprise an openwork scroll member 10 disposed within the inlet chamber 3 and rotatable so as to cause uranyl fluoride particles to circulate in the inlet chamber 3 and pass both through and around the plume 5 of uranyl fluoride as the particles are transferred from the bottom of the inlet chamber 3 to the kiln barrel 2. These particles provide nuclei which can grow with the production of further uranyl fluoride and so do the small particles of uranyl fluoride being carried back by the waste gases. By appropriate operation of the process a major proportion of the uranyl fluoride may be affected and fail to be deposited in the kiln directly from the plume. Such operation may be achieved by adjustment of various parameters including particularly the length of the plume of uranyl fluoride and the speed of rotation of the scroll member, which we have varied between 3 and 9 revolutions per minute. The length of the plume is a function of the gas velocity at the jets and we have found it necessary to make it not less than 7.0 meters per second at the hexafluoride jet and not less than 50 meters per second at the steam jet. A positive flow countercurrent to the powder is of course also normally required sufficient to blow back into the inlet chamber at least some of the finer uranyl fluoride particles which would otherwise enter the kiln and it has been found that the velocity of this countercurrent flow should be at least 0.05 meters per second. Once this velocity has been decided upon the other internal gas flow velocities can be calculated for a particular kiln.

For a given kiln the optimum conditions may need to be determined by experiments and adjustments after examination of the form of the product. An indication of the existence of circulation in the first region can be provided by injection of a radioactive tracer. Thus in one series of tests using molybdenum 99 hexafluoride we found that no tracer reached the kiln until at least 20 seconds after its injection with the steam and uranium hexafluoride which formed the plume in the inlet chamber, that tracer actively reached a maximum at the entry to kiln only after three minutes and that it tailed off slowly over 35 minutes, the time for half the tracer activity to pass being 13 minutes.

We claim:

1. In a process for the conversion of uranium hexafluoride to a uranium oxide which comprises injecting uranium hexafluoride and dry steam into a first region of a rotary kiln so as to form a plume of particles of uranyl fluoride in said first region, causing said particles of uranyl fluoride to be moved into a second region of the rotary kiln, and reacting the uranyl fluoride particles in said second region of the rotary kiln with a countercurrent flow of steam or hydrogen or an admixture thereof, the improvement which comprises circulating a major proportion of the uranyl fluoride particles within the first region to cause the original uranyl fluoride particles to grow and agglomerate in a dendritic manner, whereby uranyl fluoride particles moved into said second region of the rotary kiln are dendritic.

2. A process according to claim 1 wherein said vessel comprises an inclined rotating barrel kiln having an inlet chamber forming said first region of the vessel, a kiln chamber having heating means and forming said second region, and wherein said process comprises injecting said dry steam and uranium hexafluoride substantially horizontally through coaxial tubes into said inlet chamber to form a plume of uranyl fluoride particles in said first region, moving uranyl fluoride particles deposited on the bottom of said inlet chamber to said second region for passage through said kiln chamber, collecting uranyl fluoride particles carried back into said inlet chamber by gases emerging from the upper end of said kiln chamber, and wherein circulation of said uranyl fluoride particles in said first region is effected by causing the collected uranyl fluoride particles to fall through said plume and by passing uranyl fluoride particles through and around said plume as said particles are being moved from the bottom of said inlet chamber to said kiln chamber.

* * * * *